United States Patent
Premke

(10) Patent No.: US 9,049,219 B2
(45) Date of Patent: Jun. 2, 2015

(54) DEVICE AND METHOD FOR SPECIFYING A TRANSMISSION CHANNEL OF A SLAVE

(71) Applicant: SIEMENS AKTIENGESELLSCHAFT, Munich (DE)

(72) Inventor: Markus Premke, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 150 days.

(21) Appl. No.: 13/798,488

(22) Filed: Mar. 13, 2013

(65) Prior Publication Data

US 2013/0250967 A1 Sep. 26, 2013

(30) Foreign Application Priority Data

Mar. 23, 2012 (EP) .................................... 12161006

(51) Int. Cl.
*H04L 12/28* (2006.01)
*H04L 29/06* (2006.01)
*H04L 12/403* (2006.01)

(52) U.S. Cl.
CPC .............. *H04L 69/14* (2013.01); *H04L 12/403* (2013.01)

(58) Field of Classification Search
CPC . H04W 28/18; H04W 64/006; H04W 72/048; H04W 72/04; H04L 5/0035; H04L 5/0055; H04L 5/0057; H04L 12/2869; H04L 12/5695; H04L 47/00; H04L 47/70; H04L 47/78; H04L 47/821; H04L 47/827
USPC ......... 370/203, 204–215, 229–240, 310–394, 370/395.1, 395.3, 395.4, 395.41, 395.42, 370/395.5, 395.52, 431–529, 523–520
See application file for complete search history.

(56) References Cited

U.S. PATENT DOCUMENTS

| | | | | |
|---|---|---|---|---|
| 6,449,715 | B1 * | 9/2002 | Krivoshein ........................ 713/1 |
| 2004/0193396 | A1 * | 9/2004 | Jones et al. ..................... 703/22 |
| 2007/0185589 | A1 * | 8/2007 | Duarte et al. ................... 700/22 |
| 2009/0025956 | A1 * | 1/2009 | Stubbs ......................... 174/68.2 |
| 2010/0115166 | A1 * | 5/2010 | Jeganathan et al. ........... 710/110 |
| 2010/0149997 | A1 * | 6/2010 | Law et al. ..................... 370/248 |
| 2010/0185857 | A1 * | 7/2010 | Neitzel et al. ................. 713/168 |
| 2010/0262736 | A1 * | 10/2010 | Wiesgickl ..................... 710/110 |
| 2011/0009146 | A1 * | 1/2011 | Hegde .......................... 455/509 |
| 2011/0238876 | A1 * | 9/2011 | Weddingfeld et al. ........ 710/110 |
| 2013/0073760 | A1 * | 3/2013 | Wiesgickl ..................... 710/106 |
| 2013/0103877 | A1 * | 4/2013 | Burr et al. ..................... 710/315 |
| 2014/0025854 | A1 * | 1/2014 | Breuninger ................... 710/110 |

FOREIGN PATENT DOCUMENTS

EP 2410802 A1 1/2012
FR 2928516 A1 9/2009

OTHER PUBLICATIONS

EPA Form 1507N, International Search Report/Office Action, European Patent Application No. EP 12161006.7 Filed Mar. 23, 2012.

* cited by examiner

*Primary Examiner* — Jung-Jen Liu
(74) *Attorney, Agent, or Firm* — Harness, Dickey & Pierce, P.L.C.

(57) ABSTRACT

A method is disclosed for specifying a transmission channel within a multichannel communication system for a slave of the communication system, as well as to a device of a multichannel communication system. In at least one embodiment of the method, wherein a master can communicate with a safe slave and with a normal slave within the communication system, the transmission channel of a slave of the communication system is specified explicitly as a function of the slave type of the slave.

11 Claims, 1 Drawing Sheet

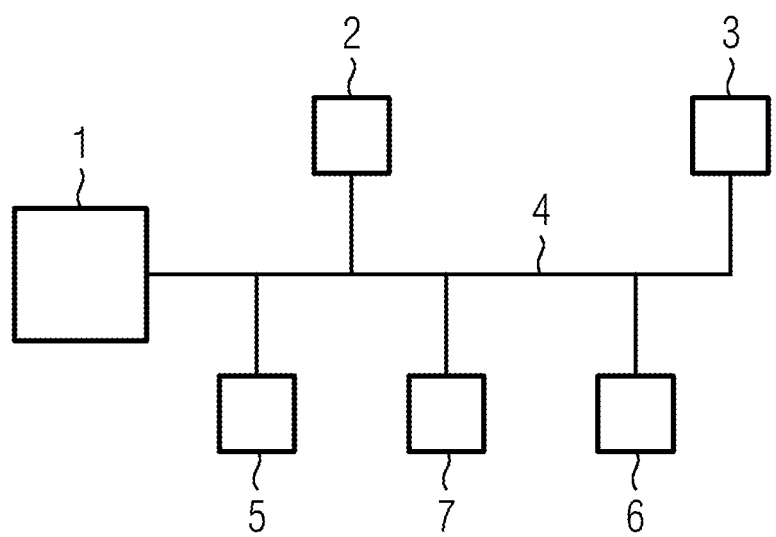

DEVICE AND METHOD FOR SPECIFYING A TRANSMISSION CHANNEL OF A SLAVE

PRIORITY STATEMENT

The present application hereby claims priority under 35 U.S.C. §119 to European patent application number EP 12161006.7 filed Mar. 23, 2012, the entire contents of which are hereby incorporated herein by reference.

FIELD

At least one embodiment of the invention generally relates to a method for specifying a transmission channel within a multichannel communication system for a slave of the communication system, and/or to a device of a multichannel communication system.

BACKGROUND

The multichannel communication system preferably finds application in the field of industrial automation technology. Inasmuch as it is a multichannel communication system, the communication system has at least two transmission channels via which data can be exchanged between communication system users. Communication system users of the multichannel communication system are in particular a master and at least two slaves. The master is connected to the slaves of the communication system. For communication purposes the slaves are assigned a unique separate transmission channel via which the data transmission between the master and the respective slaves takes place.

A distinction is generally made in the industrial automation technology field between normal applications and safety-related applications. Safety-related applications must conform to higher safety requirements than the normal applications. In safety-related applications the communication and/or the communication user per se must be embodied as more safety-related in particular in comparison with normal applications. A distinction can therefore be made between two slave types: safe slaves and normal slaves. Safe slaves are embodied in safety-related form as compared with the normal slaves and/or can communicate in a safety-related manner within the communication system.

SUMMARY

At least one embodiment of the present invention provides an improved multichannel communication system. Within a communication system of the type, a master can preferably communicate with safe slaves and normal slaves.

A method is disclosed in at least one embodiment for specifying a transmission channel within a multichannel communication system for a slave of the communication system, wherein a master can communicate with a safe slave and with a normal slave within the communication system, wherein the transmission channel of a slave of the communication system is specified explicitly as a function of the slave type of the slave. A device of a multichannel communication system is also disclosed in at least one embodiment, wherein a master can communicate with a safe slave and with a normal slave within the communication system, wherein the device specifies the transmission channel of a slave of the communication system explicitly as a function of the slave type of the slave.

Advantageous developments of the invention are disclosed in the dependent claims.

BRIEF DESCRIPTION OF THE DRAWINGS

The invention and embodiments of the invention are described and explained in more detail below with reference to the example embodiment illustrated in the FIGURE.

The FIGURE is a schematic diagram illustrating a multichannel communication system. The communication system comprises a master 1, a first normal slave 2, a second normal slave 3, a first safe slave 5, a second safe slave 6, a power supply unit 7, and a communication bus 4.

DETAILED DESCRIPTION OF THE EXAMPLE EMBODIMENTS

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the FIGURES.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGURES. For example, two FIGURES shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the FIGURES. It will be understood that the spatially relative terms are intended to encompass different orientations of the device in use or operation in addition to the orientation depicted in the FIGURE. For example, if the device in the FIGURES is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The communication system comprises at least two slave types: the safe slaves as first slave type and the normal slaves as second slave type. Compared with the normal slaves, safe slaves are embodied as safety-related, i.e. they communicate within the communication system in a safety-related manner, have a safety-related structure and/or are provided for a safety-related application within the communication system.

The multichannel communication system has at least two transmission channels. The transmission channel characterizes in particular a specific carrier frequency within the communication system via which the data exchange with the respective communication user (master, slave) takes place. The communication between the master and the slaves takes place in particular by means of a characteristic transmission channel of the communication system assigned in each case to the respective slave. Thus, two slaves communicate with the master within a communication cycle, not via the same transmission channel, but via the transmission channel specified for the individual slave in each case.

An advantage achieved by at least one embodiment of the invention is that compared with the normal slaves a more stable transmission channel of the communication system can be explicitly assigned to the safe slaves. In this way a more reliable, more stable system can be created with regard to the safety-related application of the communication system.

The transmission channel of the slave is specified in particular automatically by a corresponding device (e.g. by the master or an addressing device).

In an advantageous embodiment variant of the invention, a distinction is drawn between a stable transmission channel and a normal transmission channel, the slave type of the slave initially being determined in order to specify the transmission channel of the slave and its transmission channel being determined as a function of its slave type.

The slave type is preferably determined by reading out the profile of the slave. The slave type (safe slave or normal slave) is contained in particular in the identifier, in particular in the profile or in the device description file, of the respective slave.

Safe slaves are provided in particular for safe communication within the communication system, while normal slaves are provided for normal communication within the communication system. With safe slaves, in contrast to the normal slaves, a CRC (Cyclic Redundancy Check) value is preferably transferred within their telegram in addition to their payload data. In this way the receiver of the telegram (the slave and/or the master) can carry out a safety check in respect of the safe telegram. Unlike the normal slaves, therefore, safe slaves preferably perform a CRC check in the course of their communication.

In a further advantageous embodiment variant of the invention the stable transmission channel is specified for a safe slave, and the normal transmission channel is specified for a normal slave.

In a further advantageous embodiment variant of the invention the stable transmission channel has a higher signal-to-noise ratio than the normal transmission channel.

At least two groups are formed within the communication system in particular with regard to the available transmission channels: stable transmission channels and normal transmission channels.

The stable transmission channel having the lowest signal-to-noise ratio has in particular a higher signal-to-noise ratio than the normal transmission channel having the highest signal-to-noise ratio.

In a further advantageous embodiment variant of the invention the method is performed automatically by the master during the device power-up of the master.

In a further advantageous embodiment variant of the invention the communication system comprises the master, the safe slave and the normal slave, the master determining the slave type of the slaves and explicitly specifying the stable transmission channel for the safe slave and explicitly specifying the normal transmission channel for the normal slave for communication within the communication system.

In a further advantageous embodiment variant of the invention, the device is embodied for performing at least one embodiment of the method. The device is in particular a master or an addressing device of the communication system.

In a further advantageous embodiment variant of the invention, the device can independently determine the slave type of a slave of the communication system and explicitly specifies the transmission channel of the slave within the communication system as a function of the determined slave type of the slave.

In an advantageous embodiment variant of the invention, the multichannel communication system is an OFDM communication system. OFDM stands for Orthogonal Frequency-Division Multiplexing.

As a special implementation of multicarrier modulation, OFDM is a modulation method which uses a plurality of orthogonal carriers for digital data transmission.

The system is in particular a DMT communication system (DMT=Discrete Multitone Transmission), which is an advantageous embodiment of the OFDM communication system.

In a further advantageous embodiment variant of the invention, a transmission channel basically consists of two carrier frequencies A and B, for uplink and downlink in each case. These two carrier frequencies are preferably embodied redundantly, with one thereof representing the valid payload data of the channel.

In a further advantageous embodiment variant of the invention, the maximum cycle time within the communication system is 4 ms. It ranges in particular between 1 and 4 ms. The cycle time is in particular the time during which the master can send a telegram to all slaves of the communication system and preferably receive a telegram from all slaves.

In a further advantageous embodiment variant of the invention, the communication system is an AS-i system (Actuator Sensor interface system). The master is therefore an AS-i master, the normal slave an AS-i slave, and the safe slave a safe AS-i slave (e.g. an AS-i Safety At Work slave).

The FIGURE is a schematic diagram illustrating a multichannel communication system. The communication system comprises a master 1, a first normal slave 2, a second normal slave 3, a first safe slave 5, a second safe slave 6, a power supply unit 7, and a communication bus 4.

The master 1 is connected to its communication system users 2,3,5,6 via the communication bus 4. The communication bus 4 is embodied as a two-wire cabling arrangement, wherein a power supply for the communication system users 2,3,5,6 is also realized by way of the communication bus 4 in addition to the communication capability. For that purpose the power supply unit 7 is connected to the communication bus 4. The operating voltage on the communication bus ranges between 20 volts and 40 volts, in particular is 30 volts.

A plurality of transmission channels (carrier frequencies) are available to the master 1 for communication with the slaves 2,3,5,6. The system is therefore a multichannel communication system.

With regard to the transmission channels available, the master 1 differentiates between stable transmission channels and normal transmission channels. Stable transmission channels have a higher signal-to-noise ratio than the normal transmission channels. In particular a first threshold value in respect of the signal-to-noise ratio is stored in the master so that it can form the group of normal transmission channels (undershooting the first threshold value) and the group of stable transmission channels (exceeding the first threshold value).

Also stored in the master 1 is a second threshold value by means of which the minimum requirement in respect of the signal-to-noise ratio in relation to the transmission channels having the normal slaves 2,3 is defined. Each transmission channel for a normal slave 2,3 must lie above the second threshold value so that the minimum requirement in terms of the signal-to-noise ratio is fulfilled at all times. In this way reliable communication with the normal slaves 2,3 can be guaranteed by the master 1.

With regard to its communication spectrum the master 1 accordingly determines, preferably during its device power-up, the quality of the available transmission channels of the communication system and categorizes the transmission channels in accordance with the first and second threshold value. If the first threshold value is exceeded, a stable transmission channel is available for a safe slave. If the first threshold value is undershot and the second threshold value exceeded, a normal communication channel is available for a normal slave. If the second threshold value is undershot, said communication channel is not used for communication with a normal and/or safe slave.

Thus, the master 1 automatically determines the stable and normal transmission channels during its device power-up. In addition it automatically determines the slave type of the slave connected to the communication bus 4 by means of a polling cycle over the communication bus 4. For that purpose the master 1 evaluates in particular the slave profile (e.g. the device description file) of the connected slave.

The communication system has normal slaves 2,3 and safe slaves 5,6. In contrast to the normal slaves 2,3, safe slaves 5,6 are embodied in safety-related form. In comparison with the communication between the normal slaves 2,3 and the master 1, the communication between safe slaves 5,6 and the master 1 has a CRC value. This enables a CRC check to be carried out on the receiver side (master 1 or safe slave 5,6). The CRC check can be conducted in the master 1, in particular by means of a separate safe unit, though it can also be performed decentralized from the master 1, by means of a safe device. In addition or alternatively a safe slave is preferably embodied redundantly in terms of parts of its hardware and/or parts of its software.

After the master 1 has determined the slave type of the connected slave the transmission channel of the connected slave of the communication system is specified explicitly by the master 1 as a function of the slave type of the slave. At this time the connected slave is explicitly assigned its specific transmission channel within the communication system.

If the result of the evaluation of the slave profile of the connected slave indicated that the slave is a safe slave 5,6, the slave is assigned one of the stable transmission channels by the master 1. The safe slave 5,6 subsequently communicates via its assigned stable transmission channel until it is assigned a new stable transmission channel.

If, on the other hand, the result of the evaluation of the slave profile revealed that the slave is a normal slave 2,3, one of the normal transmission channels is assigned to it by the master 1. The normal slave 2,3 subsequently communicates via its assigned normal transmission channel until it is assigned a new normal transmission channel.

With regard to the allocation of the stable transmission channels, the master explicitly handles the safe slaves preferentially. Preferentially is to be understood in this context as meaning that for stability reasons, on account of the transmission concept used (OFDM), the "most stable" transmission channels (highest signal-to-noise ratio) are assigned by preference to the most sensitive bus users, that is to say safety devices (safe slaves).

This special form of frequency management is of great advantage for the communication system because the stable communication channels are explicitly assigned to the safety-related part of the communication system. In this way the safety-related system/the safety-related application of the communication system is embodied as more stable and consequently as more reliable.

On account of the safety requirements the safety failure probabilities can be minimized by means of the explicit, targeted assignment of transmission channels. Since the number of potential failed telegrams on the bus is higher for standard devices than for safety devices, the communication system is not detrimentally affected thereby.

It is also conceivable that when a transmission channel of a newly connected slave is specified the master is referred not just to channels held in reserve (transmission channels not yet occupied by slaves of the communication system), but instead the transmission channels of the already connected slaves are dynamically adapted in each case during ongoing operation. What is meant in this case is that the most stable transmission channels available in the communication system are always used explicitly for a safe slave. In this way an extremely stable system can be created with regard to the safety-related application of the communication system.

The transmission channels can change if necessary during ongoing live operation, such that after a communication cycle for a connected slave (in which a transmission channel has already been assigned by the master 1) a change with respect to the preceding transmission channel takes place. The stability of the most sensitive users (safe slaves) can be markedly increased as a result and the "disadvantage" of the "more rigorous" monitoring as compared with standard components (normal slaves) compensated for.

It is also conceivable for the group of stable transmission channels and of safe slaves to be subdivided further. In particular a hierarchical structure is feasible in terms of the stable transmission channels and the safe slaves. For this purpose the safe slaves are subdivided hierarchically e.g. in terms of their safety relevance. The stable transmission channels are subdivided hierarchically in terms of their signal-to-noise ratio. The safe slave having the highest safety relevance in respect of the connected safe slaves is assigned the most stable transmission channel, i.e. the channel having the highest signal-to-noise ratio. The remaining stable transmission channels available are allocated to the safe slaves in descending order of safety relevance of the safe slaves connected to the communication system. In this way a hierarchical allocation of the stable transmission channels to the safe slaves is realized in relation to their safety relevance.

In addition to the differentiation of the slave type into safe slave and normal slave it is equally conceivable for the normal slaves to be subjected to a further subcategorization. With regard to said subgroups of the normal slave type the master can also carry out an explicit assignment of the transmission channels such that e.g. the slaves of the first normal slave type are assigned more stable transmission channels, i.e. the carrier frequency has a higher signal-to-noise ratio, than the slaves of the second normal slave type. The signal-to-noise ratio of the carrier frequency of the first normal slave type is nonetheless lower than the signal-to-noise ratio of the carrier frequency of the safe slaves.

The master 1 includes a processing unit for the purpose of performing the necessary method steps. Said processing unit enables in particular the slave type of the connected slave to be determined and the communication channel to be specified for the connected slave. As a result of the communication channel being specified for the connected slave, in particular the communication channel to be used within the communication system for the connected slave is determined and communicated to the slave.

If the communication system is e.g. an AS-i system, the transmission channel assignment is controlled by the AS-i master. The master has the task of allocating the available transmission channels (carrier frequencies) in an optimal manner to the available slaves, in particular during power-up, on the basis of measurements that determine the signal-to-noise ratio. It may also be necessary to reallocate or change the transmission channels during ongoing live operation due to deteriorating signal-to-noise ratio values of the transmission channels. During power-up the AS-i master therefore has the possibility of identifying, e.g. by way of the AS-i profile, to which device type the connected slave belongs (e.g. sensor, actuator, sensor/actuator, normal slave or safe slave). It can advantageously use this information during application of the transmission channel assignment technique for the communication users that by definition are most rigorously monitored. These are the safety devices (safety devices having safe inputs and/or outputs) and consequently the safe slaves.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims.

Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for specifying a transmission channel for communication between a master and a slave of a multichannel communication system, the method comprising:
   determining, by the master, a type of the slave;
   determining a stability of the transmission channel based on a signal-to-noise ratio associated therewith;
   assigning the transmission channel as one of a stable transmission channel and a normal transmission channel based on the determined stability thereof; and
   specifying, by the master, the transmission channel of the slave as one of the stable transmission channel and the normal transmission channel based on the determined type of the slave, wherein the stable transmission channel has a relatively higher signal-to-noise ratio than the normal transmission channel.

2. The method of claim 1, wherein the stable transmission channel is specified if the determining determines that the type of the slave is a safe slave and the normal transmission channel is specified if the determining determines that the type of the slave is a normal slave.

3. The method of claim 1, wherein the method is performed automatically by the master during a device power-up of the master.

4. The method of claim 1, wherein the communication system includes the master, the safe slave and the normal slave, and the master is configured to determine the type of the slave and explicitly specify the stable transmission channel for the safe slave and explicitly specify the normal transmission channel for the normal slave for the purpose of communication within the communication system.

5. The method of claim 1,
wherein
the specifying includes specifying the transmission channel of the slave such that the slave is assigned to communicate over the stable transmission channel if the type of the slave is a safe slave and the slave is assigned to communicate over the normal transmission channel if the type of the slave is a normal slave.

6. The method of claim 5, wherein the master device is configured to carry out a safety check using a cyclic redundancy check (CRC) value received along with a payload from the safe slave, the CRC value not being received along with the payload from the normal slave.

7. The method of claim 1, wherein the stable transmission channel and the normal transmission channel each have a different carrier frequency associated therewith.

8. A master device of a multichannel communication system, the mater device configured to communicate with a slave within the communication system, the master device comprising:

a processor and a memory, the memory containing computer readable code that, when executed by the processor, configures the processor to,
determine a type of the slave,
determine a stability of the transmission channel based on a signal-to-noise ratio associated therewith,
assign the transmission channel as one of a stable transmission channel and a normal transmission channel based on the determined stability thereof, and
specify a transmission channel of the slave as one of the stable transmission channel and the normal transmission channel based on the determined type of the slave, wherein
the stable transmission channel has a relatively higher signal-to-noise ratio than the normal transmission channel.

9. The master device of claim 8, wherein the processor is configured to specify the transmission channel of the slave such that the slave is assigned to communicate over the stable transmission channel if the type of the slave is a safe slave and the slave is assigned to communicate over the normal transmission channel if the type of the slave is a normal slave.

10. The master device of claim 9, wherein the master device is configured to carry out a safety check using a cyclic redundancy check (CRC) value received along with a payload from the safe slave, the CRC value not being received along with the payload from the normal slave.

11. The master device of claim 8, wherein the stable transmission channel and the normal transmission channel each have a different carrier frequency associated therewith.

\* \* \* \* \*